(12) United States Patent
Capoldi

(10) Patent No.: US 10,570,960 B2
(45) Date of Patent: Feb. 25, 2020

(54) SEGMENTED CAGE FOR ROLLING BEARING

(71) Applicant: Aktiebolaget SKF, Gothenburg (SE)

(72) Inventor: Bruno Capoldi, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/020,170

(22) Filed: Jun. 27, 2018

(65) Prior Publication Data
US 2019/0010985 A1    Jan. 10, 2019

(30) Foreign Application Priority Data

Jul. 5, 2017 (DE) .......... 10 2017 211 488

(51) Int. Cl.
| | |
|---|---|
| *F16C 33/46* | (2006.01) |
| *F16C 43/06* | (2006.01) |
| *F16C 33/51* | (2006.01) |
| *F16C 19/30* | (2006.01) |

(52) U.S. Cl.
CPC ...... *F16C 33/4617* (2013.01); *F16C 33/4605* (2013.01); *F16C 33/4676* (2013.01); *F16C 33/513* (2013.01); *F16C 43/065* (2013.01); *F16C 19/305* (2013.01); *F16C 2204/12* (2013.01); *F16C 2204/60* (2013.01); *F16C 2300/22* (2013.01); *F16C 2352/00* (2013.01)

(58) Field of Classification Search
CPC .... F16C 33/4605; F16C 33/51; F16C 33/513; F16C 33/516; F16C 33/56
See application file for complete search history.

(56) References Cited

U.S. PATENT DOCUMENTS

| | | | | |
|---|---|---|---|---|
| 6,790,297 | B1 * | 9/2004 | Ueda ....................... | F16C 33/56 148/432 |
| 8,882,361 | B2 * | 11/2014 | Sekido ................... | E02F 9/123 384/623 |
| 2015/0147016 | A1 * | 5/2015 | Yasuda ................. | F16C 33/467 384/577 |
| 2017/0002864 | A1 * | 1/2017 | Pauskar .................. | F16C 33/38 |
| 2017/0023064 | A1 | 1/2017 | Capoldi | |

FOREIGN PATENT DOCUMENTS

| | | | | |
|---|---|---|---|---|
| DE | 102007057253 | A1 * | 6/2009 | ............. F16C 19/30 |
| EP | 2610511 | A1 * | 7/2013 | ......... F16C 33/4605 |

\* cited by examiner

*Primary Examiner* — Phillip A Johnson
(74) *Attorney, Agent, or Firm* — Allen D Hertz, P.A.; Allen D. Hertz

(57) ABSTRACT

The cage segment for rolling bearing has a main body provided with at least two pockets each configured to receive at least a roller, with two opposite cylindrical faces extending circumferentially and delimiting radially the cage segment, and with two opposite frontal faces delimiting axially the cage segment. The cage segment further provides a first group of protruding means affixed to the main body and protruding relative to the cylindrical faces, and a second group of protruding means affixed to the main body and protruding relative to the frontal faces.

16 Claims, 2 Drawing Sheets

SEGMENTED CAGE FOR ROLLING BEARING

CROSS-REFERENCE

This application claims priority to German patent application no. 102017211488.6 filed on Jul. 5, 2017, the contents of which are fully incorporated herein by reference.

TECHNOLOGICAL FIELD

The present invention relates to the field of rolling bearings, in particular rolling bearings having an inner ring and an outer ring with one or more rows of contact rollers therebetween.

BACKGROUND

The invention relates more particularly to the field of large-diameter rolling bearings, notably those used in a tunnel boring machine.

SUMMARY

A large-diameter rolling bearing comprises generally two concentric inner and outer rings, and at least a row of contact rollers arranged between raceways and guiding faces provided on the rings. Such rolling bearings are generally loaded, both axially and radially, often with a relatively strong load.

For such a large-diameter rolling bearing, it is known to use a segmented cage to receive the contact rollers. The segmented cage comprises a plurality of successive cage segments abutting in the circumferential direction one relative to the other and each configured to receive at least one contact roller. For more details, it is possible for example to refer to the patent application US 2017/0023064.

In use, the segmented cage comes into contact with the guiding faces and the raceways of the inner and outer rings. Such contacts between the cage and the rings induce an increase of the friction torque of the rolling bearing.

Classically, the segmented cage is made of expensive material such as bronze in order to reduce the friction with the inner and outer rings.

One aim of the present invention is to overcome this drawback.

In one embodiment, the cage segment is adapted for a rolling bearing comprising an inner ring, an outer ring and at least one row of contact rollers disposed between raceways provided on the rings.

The cage segment comprises a main body provided with at least two pockets each configured to receive at least a contact roller, with two opposite cylindrical faces extending circumferentially and delimiting radially the cage segment, and with two opposite frontal faces delimiting axially the cage segment.

According to a general feature, the cage segment further comprises a first group of protruding means affixed to the main body and protruding relative to the cylindrical faces, and a second group of protruding means affixed to the main body and protruding relative to the frontal faces.

This leads to a reduction of the friction contribution of the cage segment with regard to the inner and outer rings of the rolling bearing since only the protruding means may come into contact with the rings. Accordingly, it is not necessary to foresee for the main body of the spacer an expensive material such as bronze in order to reduce the friction. The main body may be made for example from steel.

Preferably, the protruding means of the first and second groups are made from material having a friction coefficient smaller than the one of the main body. Accordingly, the friction contribution of the cage segment is further reduced. For example, the protruding means of the first and second groups may be made from bronze.

In one embodiment, the protruding means of the first group protrude radially relative to the cylindrical faces. The protruding means of the second group may protrude axially relative to the frontal faces.

Preferably, the protruding means of the first and second groups are respectively regularly spaced apart one relative to the other in the circumferential direction.

Advantageously, the protruding means of the first and second groups are reversibly affixed to the main body.

The invention also relates to a segmented cage comprising a plurality of successive cage segments as previously defined and abutting in the circumferential direction one relative to the other.

The invention further relates to a rolling bearing comprising an inner ring, an outer ring, at least one row of contact rollers disposed between raceways and guiding faces provided on the inner and outer rings, and a segmented cage as previously defined for receiving the contact rollers. The protruding means of the first group of each cage segment of the cage are adapted to come into contact with the guiding faces provided on the inner and outer rings, and the protruding means of the second group of each cage segment are adapted to come into contact with the raceways provided on the rings.

BRIEF DESCRIPTION OF THE DRAWINGS

The present invention and its advantages will be better understood by studying the detailed description of a specific embodiment given by way of non-limiting example and illustrated by the appended drawings on which.

DETAILED DESCRIPTION

Figure 1:
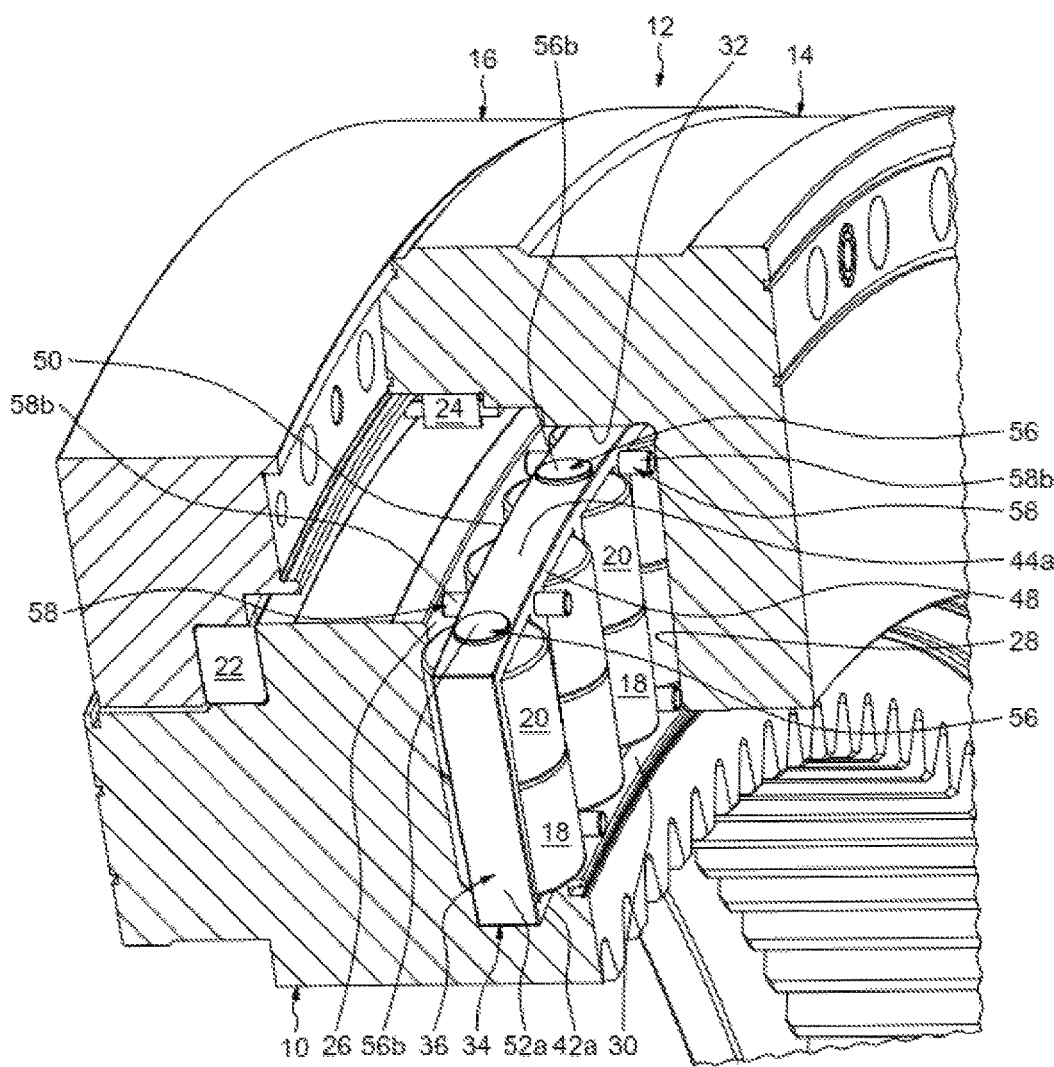
FIG. 1 is a partial perspective view in axial cross-section of a rolling bearing comprising a cage according to an example of the invention.

The rolling bearing as illustrated on FIG. 1 is a large-diameter rolling bearing comprising an inner ring 10 and an outer ring 12. The inner and outer rings 10, 12 are concentric and extend axially along the bearing rotation axis (not shown). The rings 10, 12 are of the solid type. The outer ring 12 is formed as a split ring and comprises a first ring 14 and a second ring 16 stacked one relative to the other in the axial direction. Each of the rings 14, 16 is provided with a plurality of aligned through-holes (not referenced) in order to be joined by fitting bolts (not shown).

In the illustrated example, the rolling bearing further comprises three rows of rollers 18, 20 and 22 which are arranged between the inner and outer rings 12, 14 in order to form an axial thrust, and a row of rollers 24 which are arranged between the rings to form a radial thrust.

The rollers 18 and 20 of the axial thrust are identical to one another. The rollers 22 of the axial thrust are identical to one another and can have different size than rollers 18 and 20. Each roller comprises a cylindrical outer rolling surface and two opposite frontal end surfaces delimiting the outer rolling surface. Similarly, each roller 24 of the radial thrust comprises a cylindrical outer rolling surface and two opposite frontal end surfaces. The axis of rotation of each roller 24 is parallel to the axis of the bearing and perpendicular to the axes of each or the rollers 18, 20 and 22.

The rollers 18, 20 are arranged axially between annular raceways 26, 28 respectively formed on the inner and outer rings 10, 12. Each raceway 26, 28 has in cross section a straight internal profile in contact with the rolling surfaces of the rollers 18, 20. The raceways 26, 28 face each other in the axial direction. The rollers 18, 20 are arranged radially between annular guiding faces 30, 32 respectively formed on the inner and outer rings 10, 12. The guiding faces 30, 32 face each other in the radial direction. Each guiding face 30, 32 is straight and disposed perpendicular to the corresponding raceway 26, 28.

The rolling bearing further comprises a cage 34 for maintaining the rollers 18, 20 spaced apart in the circumferential direction. The raceway 26 and the guiding face 30 of the inner ring define together with the raceway 28 and the guiding face 32 of the outer ring an annular space inside which the rollers 18, 20 and the cage 34 are housed. The rolling surfaces of the rollers 18, 20 are in contact with the raceways 26, 28. Each roller 18, 20 is maintained by the cage 34 which may bear against the raceways and the guiding faces 28, 32 as will be described later.

The cage 34 is segmented and is formed by a plurality of successive cage segments 36 abutting in the circumferential direction one relative to the other. The cage 34 is formed as a split cage.

Figure 2:
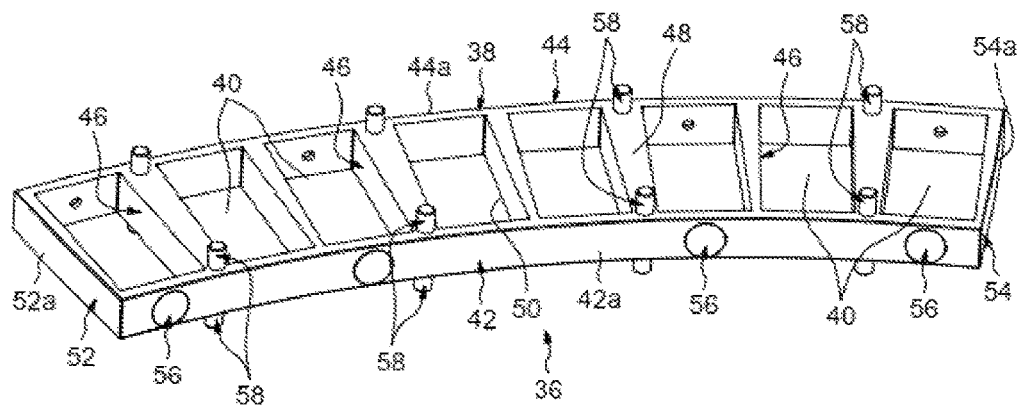
FIG. 2 is a perspective view of a cage segment of the cage of the rolling bearing of FIG. 1.
Figure 3:
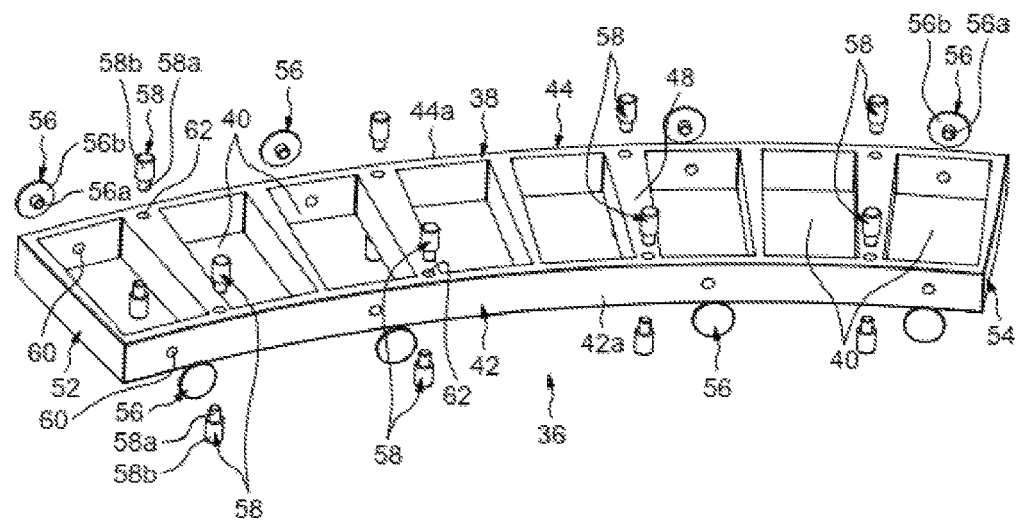
FIG. 3 is an exploded perspective view of the cage segment of FIG. 2.

As shown more clearly on FIGS. 2 and 3, each cage segment 36 comprises a main body 38 delimiting a plurality of pockets 40 configured to receive the rollers. The main body 38 may advantageously be made in one part from metal, for instance from steel.

The main body 38 of the cage segment comprises an inner cylindrical portion 42 and an opposite outer cylindrical portion 44 which extend in the circumferential direction. The inner cylindrical portion 42 comprises an inner face 42a oriented inwards and the outer cylindrical portion 44 comprises an opposite outer face 44a oriented outward. The faces 42a, 44a delimit the cage segment 36 in the radial direction. In the mounted position into the rolling bearing, the inner face 42a delimits partly the bore of the segmented cage and the outer face 44a delimits partly the outer surface of the cage.

In order to delimit the successive pockets 40, the main body 38 of the cage segment comprises a plurality of rim portions 46 extending radially between the inner and outer cylindrical portions 42, 44 and connected to the portions. The rim portions 46 are separated into a first sub-group of rim portions having a small thickness in the circumferential direction, and a second sub-group of rim portions having a larger thickness in the circumferential direction.

The main body 38 also comprises two opposite frontal faces 48, 50 delimiting axially the cylindrical faces 42a, 44a as well as the rim portions 46. The main body 38 further comprises two opposite abutting portions 52, 54 delimiting the cage segment 36 in the circumferential direction and each comprising an outer abutting face 52a, 54a. In the mounted position into the rolling bearing, each abutting face 52a, 54a of the cage segment abuts in the circumferential direction with one of the abutting faces of the successive cage segment.

Each cage segment 36 comprises first and second groups of protruding means 56, 58 affixed to the main body 38 and adapted to come into contact with the inner and outer rings of the rolling bearing.

The first group of protruding means is separated into a first sub-group of protruding means 56 affixed to the inner cylindrical portion 42 and protruding relative to the inner face 42a, and a second sub-group of protruding means 56 affixed to the outer cylindrical portion 44 and protruding relative to the outer face 44a. The protruding means 56 of the first group are identical one to another.

As shown more clearly on FIG. 3, each protruding means 56 comprises a mounting part 56a inserted into a hole 60 formed into the thickness of the inner portion 42 or outer portion 44, and a friction part 56b disposed outside of the portion. The mounting part 56a of each protruding means is press-fitted or glued into the corresponding hole 60. The friction part 56b is mounted in radial contact with the inner face 42a or the outer face 44a and protrudes outwards with respect to the face. The friction part 56b extends the mounting part 56a. In the disclosed example, the friction part 56b has a cylindrical profile. Alternatively, the friction part 56b may have a different profile, for example a rectangular or a square one. In the disclosed example, four protruding means 56 are mounted on each of the inner and outer portions 42, 44. Alternatively, the number of protruding means 56 may be different. Here, each protruding means 56 secured to the inner portion 42 is radially aligned with one of the protruding means 56 secured to the outer portion 44. Alternatively, it could be possible to foresee another arrangement.

The second group of protruding means is separated into a first sub-group of protruding means 58 affixed to the main body 38 and protruding relative to the frontal face 48, and a second sub-group of protruding means 58 affixed to the main body 38 and protruding relative to the opposite frontal face 50. The protruding means 58 of the second group are identical one to another.

Similarly to the protruding means 56, each protruding means 58 comprises a mounting part 58a inserted into a hole 62 formed into the thickness of the main body 38, and a friction part 58b disposed outside of the portion. The mounting part 58a of each protruding means is press-fitted or glued into the corresponding hole 62. The friction part 58b is mounted in radial contact with the frontal face 48 or 50 and protrudes outwards with respect to the face. The friction part 58b extends the mounting part 58a. In the disclosed example, the friction part 56b has a cylindrical profile. Alternatively, the friction part 58b may have a different profile, for example a rectangular or a square one. In the disclosed example, a protruding means 58 is secured at each end of each rim portion 46 having a larger thickness in the junction zone with the inner or outer portion 42, 44. Here, the protruding means 58 disposed on one side of one of the rim portion are axially aligned with the protruding means 58 disposed on the other side.

The protruding means 56, 58 of each cage segment are made from a material having a friction coefficient smaller than the one of the main body 38. The protruding means 56, 58 may advantageously be made from bronze.

Referring once again to FIG. 1, the protruding means 56 of each cage segment are adapted to come into contact with the guiding faces 30, 32 of the inner and outer rings, and the protruding means 58 are adapted to come into contact with the raceways 26, 28 of the rings. More precisely, the friction parts 56b, 58b of the protruding means may come respectively into contact with the guiding faces 30, 32 and with the raceways 26, 28.

With the protruding means 56 and 58, the friction contacts between each cage segment of the segmented cage and the inner and outer rings 12, 14 are reduced. Besides, since the protruding means 56 and 58 are made from a material with a low friction coefficient, there is less friction between the segmented cage 34 and the rings 12, 14.

Although the invention has been illustrated on the basis of a cage segment adapted to receive a pair of two superposed rollers inside each pocket, it should be understood that the invention can be applied to a cage segment having only one roller per pocket.

What is claimed is:

1. A cage segment for a rolling bearing comprising:
   a main body provided with at least two pockets each configured to receive at least a roller, with two opposite cylindrical faces extending circumferentially and delimiting radially the cage segment, and with two opposite frontal faces delimiting axially the cage segment, wherein
   the cage segment further includes a first set of protrusions affixed to the main body and protruding relative to the cylindrical faces, and a second set of protrusions affixed to the main body and protruding relative to the frontal faces, and
   wherein the protrusions of the first set of protrusions each include a pin portion received in an opening in the main body of the cage segment and a head portion overlying the opening.

2. The cage segment according to claim 1, wherein the protrusions of the first and second groups are made from bronze.

3. The cage segment according to claim 1, wherein the main body is made from steel.

4. The cage segment according to claim 1, wherein the protrusions of the first group protrude radially relative to the cylindrical faces.

5. The cage segment according to claim 1, wherein the protrusions of the second group protrude axially relative to the frontal faces.

6. The cage segment according to claim 1, wherein the protrusions of the first and second groups are respectively regularly spaced apart one relative to the other in the circumferential direction.

7. The cage segment according to claim 1, wherein the protrusions of the first and second groups are reversibly affixed to the main body.

8. A segmented cage comprising:
   a plurality of successive cage segments according to claim 1 and abutting in the circumferential direction one relative to the other.

9. The cage segment according to claim 1,
   wherein the protrusion of the second set of protrusion each include a pin portion received in an opening in the main body of the cage segment and a head portion overlying the opening, and
   wherein the head portions of the first set of protrusion are different from the head portions of the second set of protrusion.

10. The cage segment according to claim 1,
    wherein the protrusions of the first set of protrusions are cylinders each having a first circular end face and a second circular end face and a first height from the first circular end face to the second cylindrical end face and a first diameter,
    wherein the protrusions of the second set of protrusions are cylinders each having a third circular end face and a fourth circular end face and a second height from the third circular end face to the fourth cylindrical end face and a second diameter,
    wherein the first height is less than the first diameter and the second height is greater than the second diameter.

11. A cage segment for a rolling bearing comprising:
    a main body provided with at least two pockets each configured to receive at least a roller, with two opposite cylindrical faces extending circumferentially and delimiting radially the cage segment, and with two opposite frontal faces delimiting axially the cage segment, wherein
    the cage segment further includes a first group of protrusions affixed to the main body and protruding relative to the cylindrical faces, and a second group of protrusions affixed to the main body and protruding relative to the frontal faces, and
    wherein the protrusions of the first and second groups are made from material having a friction coefficient less than a friction coefficient of the main body.

12. The cage segment according to claim 11,
    wherein the protrusion of the first group of protrusion each include a pin portion received in an opening in the main body of the cage segment and a head portion overlying the opening.

13. The cage segment according to claim 11,
    wherein the protrusions of the first group of protrusions are cylinders each having a first circular end face and a second circular end face and a first height from the first circular end face to the second cylindrical end face and a first diameter,
    wherein the protrusions of the second group of protrusions are cylinders each having a third circular end face and a fourth circular end face and a second height from the third circular end face to the fourth cylindrical end face and a second diameter,
    wherein the first height is less than the first diameter and the second height is greater than the second diameter.

14. A rolling bearing comprising:
    an inner ring comprising an inner ring raceway and an inner ring guiding face,
    an outer ring comprising an outer ring raceway and an outer ring guiding face,
    a segmented cage comprising a plurality of cage segments abutting in a circumferential direction disposed between inner ring raceway and the outer ring raceway, each of the cage segments including a plurality of pockets, and
    at least one contact roller disposed in each of the plurality of pockets,
    wherein each of the cage segments comprises a main body with two opposite cylindrical faces extending circumferentially and delimiting radially the cage segment, and with two opposite frontal faces delimiting axially the cage segment, and a first set of protrusions affixed to the main body and protruding relative to the cylindrical faces, and a second set of protrusions affixed to the main body and protruding relative to the frontal faces, and
    wherein the first set of protrusions of each cage segment are adapted to come into contact with the inner and outer guiding faces, and the the second set of protrusions of each cage segment are adapted to come into contact with the inner and outer raceways.

15. The rolling bearing according to claim 14, wherein each protrusion of the first set of protrusions and/or each protrusion of the second set of protrusions includes a pin portion received in an opening in the main body of the cage segment and a head portion overlying the opening.

16. The rolling bearing according to claim 15, wherein the first set of protrusion and/or the second set of protrusion are made from material having a friction coefficient less than a friction coefficient of the main body.

* * * * *